United States Patent

Deuschle et al.

[11] Patent Number: 5,833,247
[45] Date of Patent: Nov. 10, 1998

[54] DRILL CHUCK

[75] Inventors: Heinz Deuschle, Oberboihingen; Manfred Schulz, Nürtingen, both of Germany

[73] Assignee: Metabowerke GmbH & Co., Nurtingen, Germany

[21] Appl. No.: 803,010

[22] Filed: Feb. 21, 1997

[30] Foreign Application Priority Data

Feb. 23, 1996 [DE] Germany .................. 196 06 795.2

[51] Int. Cl.$^6$ .................................. B23B 31/12
[52] U.S. Cl. ..................... 279/62; 279/140; 279/902
[58] Field of Search ................ 279/60–65, 140, 279/902

[56] References Cited

U.S. PATENT DOCUMENTS

| | | | |
|---|---|---|---|
| 5,375,858 | 12/1994 | Rohm | 279/902 |
| 5,435,578 | 7/1995 | Rohm | 279/902 |
| 5,464,230 | 11/1995 | Rohm | 279/902 |
| 5,499,829 | 3/1996 | Rohm | 279/902 |

FOREIGN PATENT DOCUMENTS

| | | |
|---|---|---|
| 0570918A2 | 11/1993 | European Pat. Off. . |
| 0680798A1 | 11/1995 | European Pat. Off. . |
| 4106129A1 | 9/1992 | Germany . |
| 4238503C1 | 11/1993 | Germany . |
| 4238461C1 | 2/1994 | Germany . |
| 4238465C1 | 2/1994 | Germany . |
| 4238464C1 | 3/1994 | Germany . |
| 2236968 | 4/1991 | United Kingdom . |

*Primary Examiner*—Steven C. Bishop
*Attorney, Agent, or Firm*—Jones, Tullar & Cooper, P.C.

[57] ABSTRACT

A drill chuck includes clamping jaws guided in openings inclined toward each other in a chuck body and displaced via a manually rotatable clamping sleeve and a blocking sleeve, which is axially displaceable and partially rotated in relation to the chuck body. The blocking sleeve can be connected with the clamping sleeve by being displaced into its axial end position. A spring operating in the circumferential direction between the chuck body and the blocking sleeve, which prestresses the blocking sleeve in relation to the chuck body in a direction corresponding to the closing direction of the clamping sleeve is provided. To increase the service life of the drill chuck it is embodied in such a way that the end of the spring on the blocking sleeve side is disposed on a plate- or disk-shaped adjusting disk which encloses the shaft of the chuck body, is interlockingly taken along with the rotation of the blocking sleeve and is axially displaceable on the blocking sleeve, and in such a way that, for limiting the rotation of the blocking sleeve in relation to the chuck body, a cam is provided, which operates between the surface of the shaft of the chuck body and the adjusting disk and is limited by two detents.

17 Claims, 2 Drawing Sheets

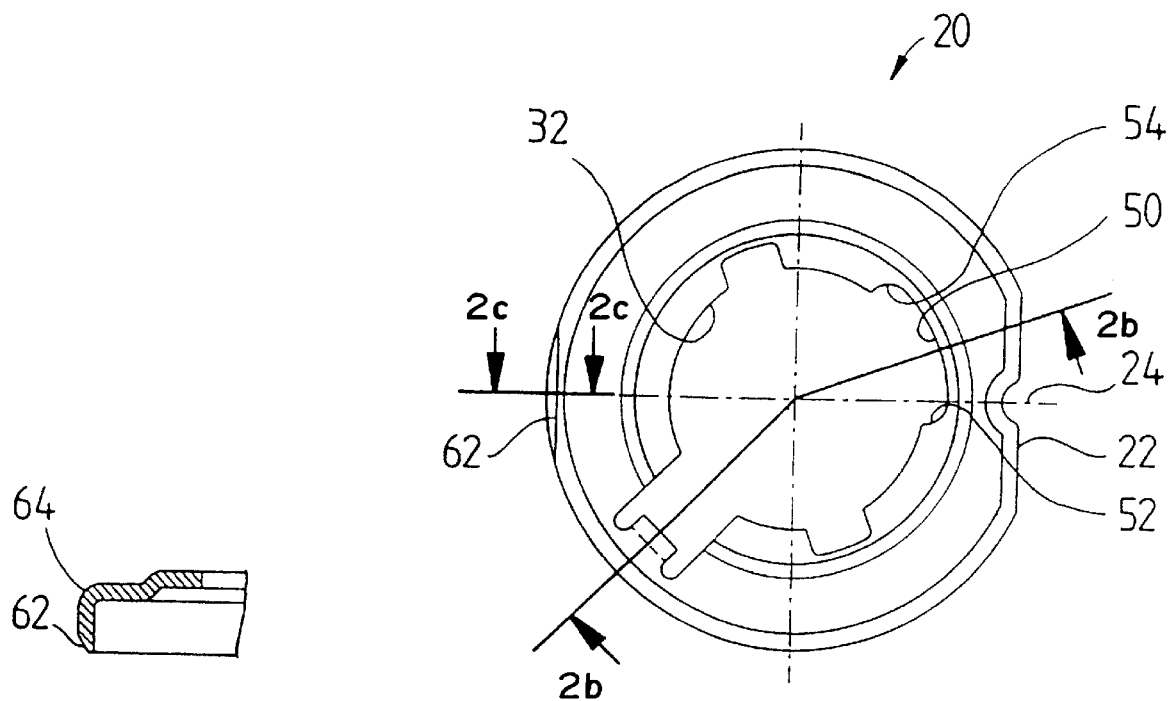
FIG. 2c
FIG. 2a
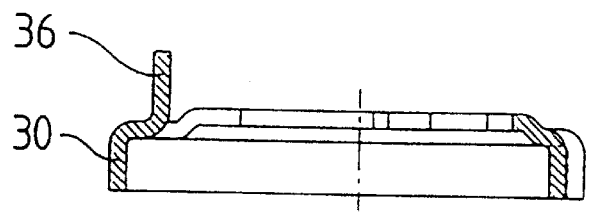
FIG. 2b

DRILL CHUCK

FIELD OF THE INVENTION

The present invention relates to a drill chuck with clamping jaws which are guided in openings inclined toward each other in a chuck body. The jaws can be displaced via a manually rotatable clamping sleeve with a thread and a blocking sleeve, which is axially displaceable and partially rotated in relation to the chuck body. The blocking sleeve can be connected with the clamping sleeve by being displaced into its axial end position with a spring operating in the circumferential direction between the chuck body and the blocking sleeve. The spring prestresses the blocking sleeve in relation to the chuck body in a direction corresponding to the closing direction of the clamping sleeve.

BACKGROUND OF THE INVENTION

In a "keyless" drill chuck of this type, the clamping jaws are not brought into firm connection against a drill bit inserted into the drill chuck with the aid of a clamping key, which can be placed in the drill chuck, but by turning the noted clamping sleeve, which coaxially encloses the chuck body. In the process, the drill bit or the drill chuck is held on the blocking sleeve. In the course of tightening the clamping sleeve, the spring is prestressed in the mentioned closing direction against the chuck body by a partial rotation of the blocking sleeve and is coupled in this prestressed state with the clamping sleeve, so that a torque in relation to the longitudinal axis of the chuck body, which operates in the closing or clamping direction, is exerted on the clamping sleeve.

Such a drill chuck is known from German Patent Publication DE 42 38 465 C1. In connection with this drill chuck a spring, which operates between the chuck body and the blocking sleeve in the circumferential direction, is fastened on one side to the blocking sleeve made of plastic and on the other side on the ring which is seated, fixed against relative rotation, on the chuck body. The limitation of the rotation of the blocking sleeve in relation to the chuck body is accomplished by means of cams radially projecting away from the chuck body and engaging a groove in the interior of the blocking sleeve extending radially and in the circumferential direction and designated as a control recess.

However, the known drill chuck is not suitable for extended use, since its service life is very limited. The spring seat on the blocking sleeve and the stops limiting the rotation are constituted by the blocking sleeve made of plastic, and therefore a large degree of wear occurs because of the forceful action of the metal spring and the large transfer of force when the cams enter the control recesses.

A drill chuck is also known from German Patent Publication DE 42 38 464 C1, wherein the limit stop of the rotary movement is formed by a cam engaging the control recess of the blocking sleeve made of plastic. With this drill chuck the spring is disposed between a blocking ring and a toothed ring, which can be partially rotated in relation to it, wherein the toothed ring itself can be connected with opposite teeth in the blocking sleeve. The blocking ring, however, is connected, fixed against relative rotation, with a jaw guide element, in which the clamping jaws are seated and can be rotated by means of this in relation to the chuck body, and the toothed ring is only taken along by the outer blocking sleeve in its coupled position. Thus, the structure of this drill chuck is basically different from that of the drill chuck in accordance with the present invention.

Further drill chucks are known from German Patent Publications DE 42 38 461 C1 and DE 42 38 503 C1, however, their springs which operate between the chuck body and the blocking sleeve are maintained directly on the blocking sleeve.

OBJECT AND SUMMARY OF THE INVENTION

It is therefore an object of the present invention to provide an improved drill chuck of the type described which has a longer service life than the known drill chuck and can be disassembled or mounted in a simple manner, but yet can be produced economically, and is at least as user-friendly as the known drill chucks.

This object is attained in accordance with the present invention in connection with a drill chuck of the type mentioned, in that the end of the spring on the blocking sleeve side is disposed on a plate- or disk-shaped adjusting disk which encloses the shaft of the chuck body, is interlockingly taken along with the rotation of the blocking sleeve and is axially displaceable on the blocking sleeve, and in that, for limiting the rotation of the blocking sleeve in relation to the chuck body, a cam is provided, which operates between the surface of the shaft of the chuck body and the adjusting disk and is limited by two detents.

It is now possible because of the arrangement of the spring in accordance with the present invention to embody the spring seat so it is less subject to wear, in that the adjusting disk is made of metal or of another material which is harder compared with the plastic material of the blocking sleeve. The rotation limitation relative to the chuck body of the adjusting disk, which is rotatingly taken along with the blocking sleeve, can be made practically free of wear. Mounting of the drill chuck in accordance with the present invention is simplified because of improved accessibility. While with the drill chuck in accordance with German Patent Publication DE 42 38 465 C1 it was necessary to fasten the spring with one end on the chuck body or on the ring which was secured against relative rotation on the chuck body, and with the other end on the interior of the blocking sleeve, the spring can now first be mounted between the chuck body and the adjusting disk and subsequently it is only required to push the blocking sleeve over the adjusting disk into its seat, which is fixed against relative rotation.

In a preferred embodiment of the present invention the cam constituting the rotation limit stop and operating between the chuck body and the adjusting disk is arranged, fixed against relative rotation, on the surface of the chuck body and engages a recess of the adjusting disk which is open at the edge of its inner opening, wherein the limit of the recess in the circumferential direction constitutes the two stops. In relation to the known embodiments, the cam and the stops are thus displaced further in the direction toward the center of the drill chuck, as a result of which, if desired, the diameter of the drill chuck could be reduced, or a greater wall thickness could be provided in the area of the blocking sleeve.

In a further development of the present inventive concept a groove, which extends in the axial direction and is open at its edge, is formed in the surface of the chuck body, into which a pin can be inserted to form the cam, which in the inserted state projects past the surface of the chuck body in the radial direction. The manufacture or processing of the chuck body is greatly simplified by this, since all that is necessary for forming the cam which limits the rotational movement is to cut a longitudinal groove into the surface of the drill chuck, or a longitudinal bore is cut prior to the rotary processing of the chuck body and subsequently the wall of the chuck body is formed on a lathe.

The end of the spring on the side of the chuck body of the drill chuck in accordance with the present invention could be attached to a protrusion, a back projection or the like disposed on the chuck body. However, in view of a simple and cost-effective production and assembly procedure, an embodiment is preferred wherein the end of the spring, on the side of the chuck body, is arranged on an adjusting disk which is fixed against relative rotation on the chuck body and which is supported on an annular flange-like section of the chuck body and connected with it, fixed against relative rotation, in any arbitrary manner.

In a further embodiment of the present invention the annular disk which forms the abutment for the end of the spring on the side of the chuck body has a recess in the edge toward its inner opening, which is open and which is engaged by the above mentioned cam in an essentially play-free manner, so that a coupling which is fixed against relative rotation is formed between the annular disk and the chuck body. It is therefore possible to achieve a coupling, fixed against relative rotation, between the chuck body and the annular disk as well as a rotary limit stop between the chuck body and the blocking sleeve or adjusting disk by means of one and the same cam.

The annular disk advantageously has a bracket bent in the axial direction for forming the abutment for the end of the spring on the side of the chuck body. In a corresponding manner, the adjusting disk can have a bracket bent in the axial direction for forming the other end of the spring on the side of the blocking sleeve.

To form the rotatingly locked connection between the adjusting disk and the blocking sleeve, the adjusting disk is advantageously flattened in at least one place in a radial direction toward the inside, and the blocking sleeve has a counter-surface which has been shaped in a complementary manner to this on its inside. It is possible by means of this to achieve a rotatingly locked connection which is interlocked in the circumferential direction without the need to dispose further coupling elements. However, it is also conceivable and can prove to be advantageous in view of an easy axial displaceability of the blocking sleeve, to form a recess in the flattened edge side of the adjusting disk which is open toward the edge and extends in the axial direction, which is engaged by a driving pin seated in the opposite surface of the blocking sleeve.

For its own reinforcement and stiffening the adjusting disk can have an edge area which is bent in the manner of a flange in the axial direction. It is preferably made of a material which is hard in relation to plastic, such as metal or a sintered or possibly ceramic material.

In accordance with a further preferred embodiment of the present invention, the blocking sleeve can be locked in at least one of its axial end positions. In this case it can prove to be advantageous if the adjusting disk, in particular the edge area of the adjusting disk which is bent flange-like in the axial direction, has stop surfaces or slide surfaces for a ball catch which is resiliently prestressed in the wall of the blocking sleeve.

Further characteristics, details and advantages of the present invention ensue from the drawing representation and the following description of an advantageous embodiment of the present invention.

BRIEF DESCRIPTION OF THE DRAWINGS

FIG. 2a is a view of the adjusting disk of the drill chuck of FIG. 1;

FIG. 2b is a section along the line b—b of FIG. 2a; and

FIG. 2c is a section along the line c—c of FIG. 2a.

DETAILED DESCRIPTION OF THE PREFERRED EMBODIMENT

Figures 1, 1A:
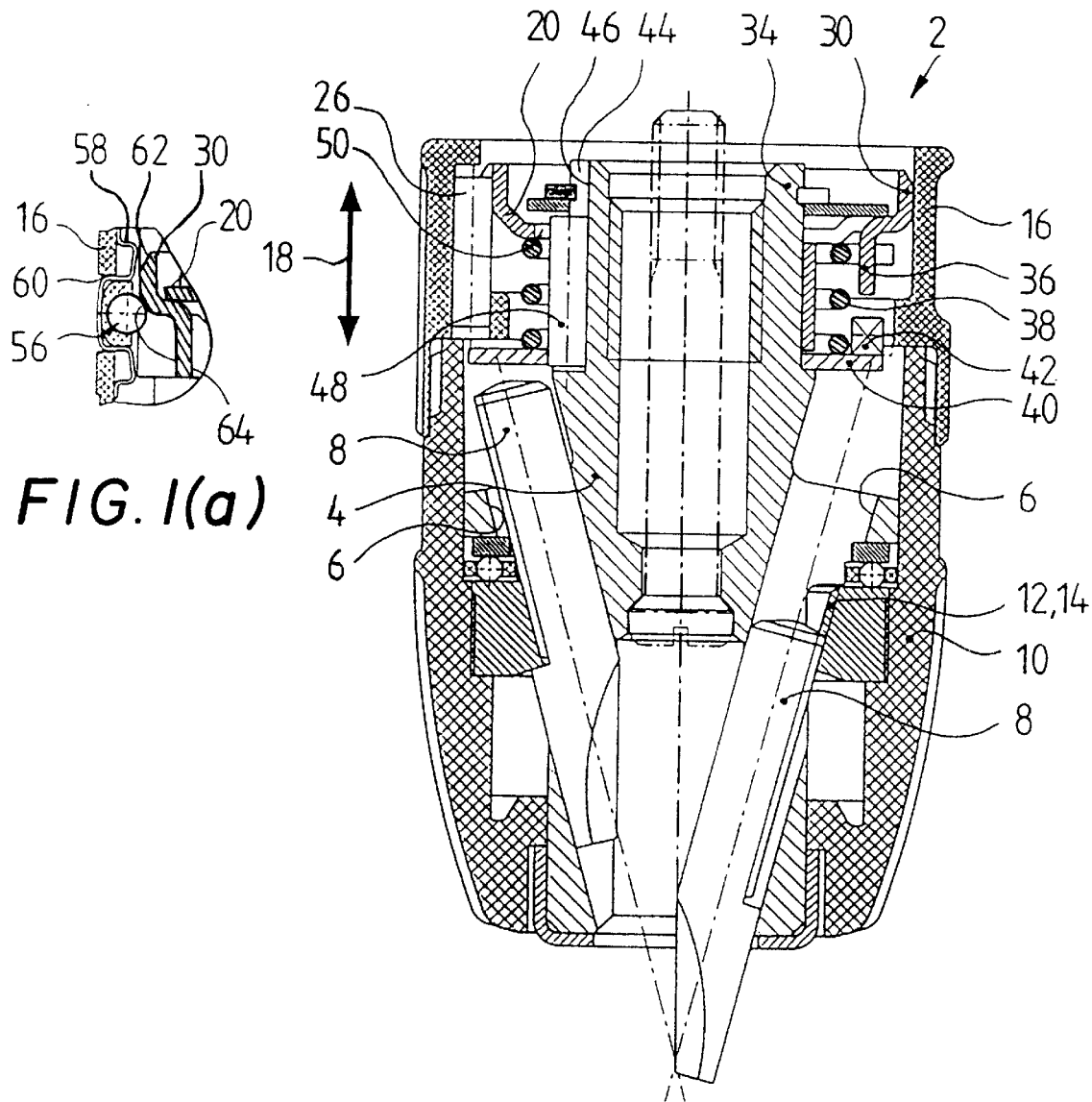
FIG. 1 is a longitudinal section through a drill chuck embodied in accordance with the present invention, with a separately represented detail which is not visible in the longitudinal section of the drill chuck shown, but instead is located at a circumferential angle relative to the longitudinal section shown.

FIG. 1 shows a drill chuck 2 in cross section, with a chuck body 4 in which openings 6 inclined toward each other have been formed to displaceably receive clamping jaws 8. In their respective openings 6, the clamping jaws 8 are adjusted by turning an outer clamping sleeve 10 with a threaded section 12, which is engaged by respective teeth 14 on the clamping jaw 8.

A blocking sleeve 16 is furthermore provided, which is displaceable in the axial direction (arrow 18) in relation to the chuck body 4, and which in its axial end position represented in FIG. 1 is coupled, fixed against relative rotation, with the clamping sleeve 10. The blocking sleeve 16 is in a rotatably locked connection with an adjusting disk 20, which is shown in various views in FIGS. 2a, b and c. The rotatably locked connection between the adjusting disk 20 and the blocking sleeve 16 is achieved via a radial flat surface 22 of the adjusting disk 20 and a groove 24 extending in the longitudinal direction in the flattened edge area, as well as by a pin 26, which engages the groove 24 and is seated in the blocking sleeve 16. However, the blocking sleeve 16 can be displaced in the axial direction in relation to the adjusting disk 20. The adjusting disk 20 has an edge area 30 which, in FIG. 1, is bent upward in a flange-like manner, because of which the adjusting disk is stiffened on the one hand and, on the other hand, is given a larger axial dimension. The disk 20 has a central opening 32, and is pushed with the central opening 32 over a shaft section 34 of the chuck body 4, on the drill spindle side. Furthermore, the disk 20 has a bracket 36 which has been stamped or nibbled out which, as seen in FIG. 1, is bent down out of the plane of the adjusting disk 20. This bracket 36 forms an abutment for an end of a spring 38 on the side of the blocking sleeve, which has also been pushed over the shaft section 34 and is supported on a further annular disk 40, which is fixed against relative rotation with the chuck body 4. The annular disk 40 has a corresponding bracket 42, bent in the axial direction, to form an abutment for the other end, on the chuck body side, of the helical spring 38. Preferably the spring 38 is always prestressed in such a way that a torque in relation to the longitudinal axis of the chuck body 4 is exerted on the adjusting disk 20 which is oriented in the same direction as a torque occurring during clamping or closing of the clamping sleeve 10.

When chucking a drill bit, not shown in the drawings, the drill bit is held by the blocking sleeve 16, and the clamping sleeve 10 is turned in the closing direction, in the course of which the clamping jaws 8 in FIG. 1 move downward. As soon as the clamping jaws 8 firmly enclose the drill bit, not shown, the chuck body 4 is turned along in the closing direction of the clamping sleeve 16. Since the annular disk 40, which constitutes the spring seating on the side of the chuck body, is connected fixed against relative rotation by means of a pin or cam 48 inserted into a groove 44 in the surface 46 of the shaft section 34, it is also rotated along. In the process, the spring 38 is tensed via the bracket 42 in the closing direction of the clamping sleeve 10. The pin or cam 48 projects past the surface 46 of the shaft section 34 and engages a recess 50 of the adjusting disk 20, the edge of which is open towards the central opening 32. The limits of the recess 50, situated in the circumferential direction, form stops 52, 54 for the pin or cam 48 and in this way constitute a limit stop for the chuck body 4 in relation to the adjusting disk 20 and the blocking sleeve 16. When the pin 48 contacts the stop 54 and in this way limits the further turning of the chuck body 4 in relation to the adjusting disk 20, the blocking sleeve 16 is pushed forward in the axial direction and in the process coupled with the clamping sleeve 10 in a manner fixed against relative rotation. In this end position the drill is then ready for operation. The blocking sleeve 16 is prestressed in the clamping direction in relation to the chuck body 4 via the annular disk 40, the spring 38 and the adjusting disk 20, and transfers this torque to the clamping sleeve 10, so that loosening of the clamping jaws 8 which occur during impact drilling is readjusted.

Finally, the detail in FIG. 1 shows a portion of the blocking sleeve 16 with a ball catch 56 acting on the flange-like bent edge area 30 of the adjusting disk 20. The ball catch 56 is held by a spring element 58 which has been inserted into an opening 60 in the blocking sleeve 16 and prestresses the ball catch 56 inward in the radial direction. The edge area 30 of the adjusting disk 20 forms stop or slide surfaces 62 and 64 for the ball catch 56. To this end the outer edge of the flange-like edge area 30 of the adjusting disk 20 is flattened, at least in sections, in order to define the axial end position, which faces away from the clamping sleeve 10, of the blocking sleeve 16.

What is claimed is:

1. A drill chuck, comprising:
    a chuck body defining a shaft section and at least two openings inclined toward each other in the longitudinal direction of said chuck body;
    at least two clamping jaws, each received in a respective one of said openings;
    a manually rotatable clamping sleeve including a threaded section;
    a blocking sleeve mounted to said chuck body to be axially displaceable and partially rotatable relative to said chuck body, said blocking sleeve defining an end position with respect to said chuck body, in which position it is connected to said clamping sleeve;
    a disk-shaped adjusting disk which surrounds said shaft section, said adjusting disk defining two circumferentially spaced apart detents;
    a cam located between said shaft section and said adjusting disk; and
    a spring situated between said chuck body and said blocking sleeve, and acts to prestress said blocking sleeve relative to said chuck body in a direction which corresponds to the closing direction of said clamping sleeve, wherein:
        one end of said spring, situated adjacent said blocking sleeve, is disposed on said adjusting disk, such that said spring is interlockingly taken along with said blocking sleeve during its rotation relative to said chuck body, and is axially displaceable relative thereto; and
        the rotation of said blocking sleeve is limited circumferentially by the engagement of said cam and said two detents.

2. The drill chuck as defined in claim 1, wherein:
    said cam is fixedly arranged against relative rotation on the surface of said chuck body; and
    said adjusting disk further defines a recess which defines said two detents at its spaced apart circumferential ends.

3. The drill chuck as defined in claim 2, wherein:
    said chuck body defines an axially directed groove which receives a pin which together form said cam; and
    said pin extends radially past the surface of said chuck body.

4. The drill chuck as defined in claim 1, further comprising:
    a further adjusting disk which is fixed against relative rotation on said chuck body, and which is axially spaced from said adjusting disk for receiving the other end of said spring.

5. The drill chuck as defined in claim 4, wherein:
    said further adjusting disk defines an edge recess which engages said cam thereby forming a coupling is formed between said further adjusting disk and said chuck body, said coupling being fixed against relative rotation.

6. The drill chuck as defined in claim 1 wherein:
    said spring is a helical spring defining a longitudinal axis, said spring concentrically enclosing said shaft section.

7. The drill chuck as defined in claim 1, wherein:
    said adjusting disk further defining a bracket which extends axially and forms the abutment for said one end of said spring.

8. The drill chuck as defined in claim 4, wherein:
    said further adjusting disk defining a bracket which extends axially and forms the abutment for said other end of said spring.

9. The drill chuck as defined in claim 1, wherein:
    said adjusting disk further defining a flattened surface in at least one place, and said blocking sleeve further defining a surface complementary to said flattened surface, said surfaces when engaged forming a rotatably locked connection.

10. The drill chuck as defined in claim 9, further comprising:
    a driving pin seated in said blocking sleeve, wherein:
        said flattened surface includes a recess which is engaged by said driving pin.

11. The drill chuck as defined in claim 1, wherein:
    said adjusting disk defines an edge area which is bent in the manner of a flange in the axial direction.

12. The drill chuck as defined in claim 1, wherein:
    said blocking sleeve can be locked in at least one of its axial end positions.

13. The drill chuck as defined in claim 13, wherein:
    at least one ball catch is provided for locking.

14. The drill chuck as defined in claim 13, wherein:
    said adjusting disk further defines stop surfaces for said ball catch, which is resiliently prestressed in the wall of said blocking sleeve.

15. The drill chuck as defined in claim 1, wherein:
    said adjusting disk is made of one of metal and sintered material.

16. The drill chuck as defined in claim 1, wherein:
    said further adjusting disk is made of one of metal and sintered material.

17. The drill chuck as defined in claim 1, wherein:
    the abutments for said spring are made of one of metal and sintered material.

* * * * *